Nov. 22, 1960     M. P. BAULEKE     2,961,326
CERAMIC COMPOSITIONS
Filed April 28, 1958

INVENTOR.
MAYNARD P. BAULEKE
BY
ATTORNEY

2,961,326
Patented Nov. 22, 1960

2,961,326
CERAMIC COMPOSITIONS

Maynard P. Bauleke, Minneapolis, Minn., assignor to Minneapolis-Honeywell Regulator Company, Minneapolis, Minn., a corporation of Delaware Filed Apr. 28, 1958, Ser. No. 731,441

9 Claims. (Cl. 106—39)

The present invention relates to improved ceramic compositions, these compositions being primarily modified steatites and having certain specific physical properties. More particularly, the compositions are designed for bonding or sealing to metallic bodies inasmuch as the thermal expansion characteristics of the ceramics closely match those of most metals including stainless steel, titanium, or the like. In this connection, high temperature bonds may be made between the improved ceramic and most metals without danger of actually cracking or otherwise fracturing the ceramic bodies.

It has been found that the thermal expansion of the compositions of the present invention range from about $10.5 \times 10^{-6}$ in./in./° C. up to $12.0 \times 10^{-6}$ in./in./° C., this expansion being substantially linear in the temperature range of from room temperature up to about 600° C. This compares with a thermal coefficient of expansion for alumina which is about $7.0 \times 10^{-6}$ in./in./° C., and for steatite which is about $8.5 \times 10^{-6}$ in./in./° C. Forsterite is a ceramic composition which has a relatively high thermal expansion, this expansion being in the range of those of the compositions of the present invention, however, forsterite is not widely used because of various disadvantages. For example, its high firing shrinkage cannot be overcome by any simple process. Steatite is the most common and widely used ceramic composition for electrical purposes today, however it possesses a relatively low thermal expansion coefficient as noted above, and hence it is not desirable for most metal sealing or bonding operations.

In addition to the desirable thermal expansion coefficients of compositions of the present invention, these materials are relatively dense and are also physically strong and sound. With proper fluxes, the material may be made substantially non-porous and hermetic seals with metal bodies are accordingly possible.

It is therefore an object of the present invention to provide an improved ceramic composition which has a thermal coefficient of expansion comparing closely with that of most metals.

It is a further object of the present invention to provide a mechanically sound ceramic material which is substantially adapted for high temperature metal-to-ceramic seals and which may be rendered substantially impervious to most gaseous fluids.

Figure 1:
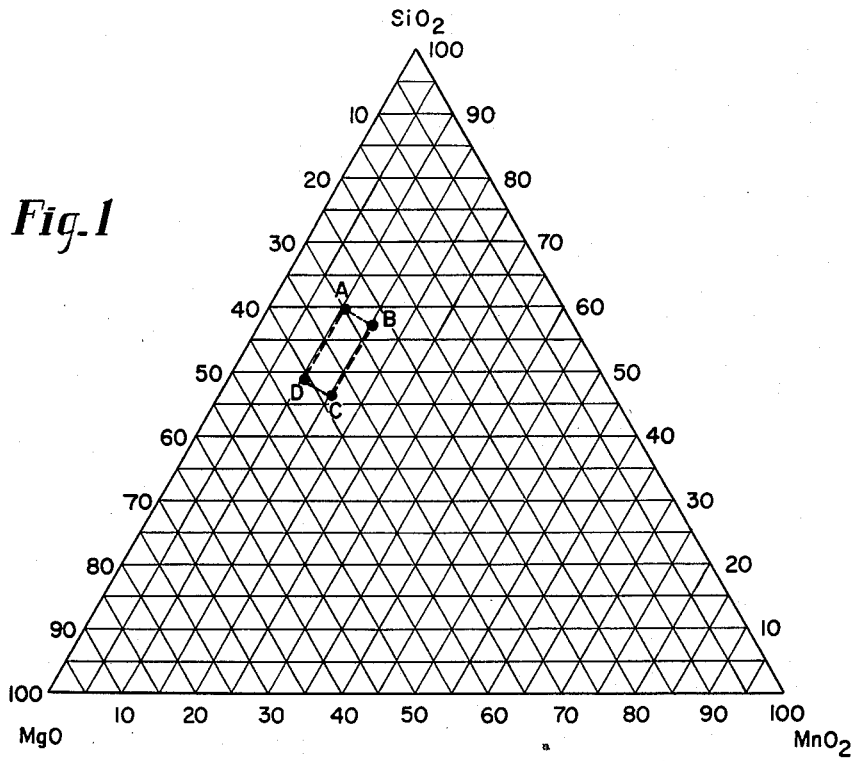
Figure 2:
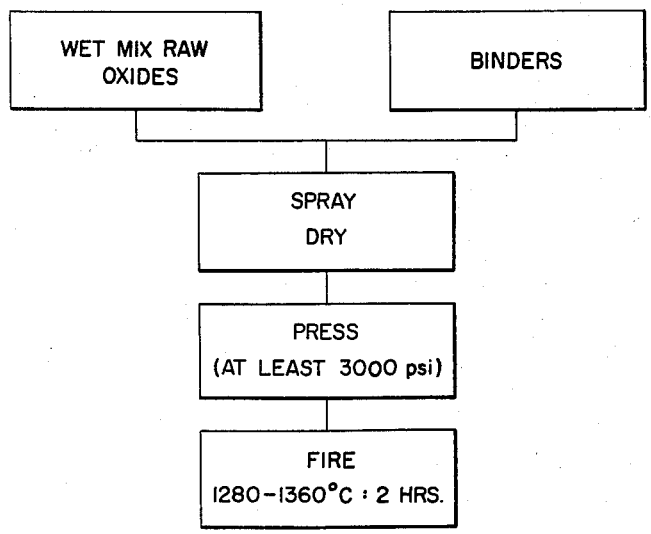

Other and further objects of the present invention will become apparent to those skilled in the art from a study of the following specification, appended claims, and accompanied drawings, wherein:

Figure 1 is a compositional graph setting out the preferred compositions in accordance with the present invention; and, Figure 2 is a schematic diagram illustrating a preferred process for preparation of finished ceramic devices in accordance with the present invention.

According to a preferred modification of the present invention, about 12% to about 18% of $MnO_2$ is added to a steatite ceramic oxide powder. The mixture together with certain fluxes which are arranged to promote vitrification at the firing temperatures utilized, is fired at a temperature of between 1280°–1360° C. for a period of about two hours. Maximum vitrification is achieved in this temperature range. (This temperature corresponds to a range of from about 11 cones to 13 cones.) Bodies produced at lower temperatures tend to have excessive porosity. Sagging, sticking, and other conventional difficulties arise when a temperature in substantial excess of 1360° C. is employed. As fluxes, nepheline syenite, calcium phosphate, glass frit, and barium carbonate are utilized. Of course, it would be appreciated that other suitable fluxing ingredients such as alkaline or alkaline earth fluxes or the like, may likewise be employed. It is preferred that a flux be chosen which will provide a desirable matrix for the oxide materials at the firing temperature utilized. The steatite which has been found preferable, includes from about 45% by weight of $SiO_2$, balance MgO, this material containing less than about 5% of $Al_2O_3$. According to the preferred modification of the present invention, about 12% to about 18% of $MnO_2$ is added to a steatite ceramic oxide powder. When $MnO_2$ is added in an amount as low as about 10% by weight, based on the weight of the steatite, the thermal coefficient of expansion falls to a low level. When this compound is added in an amount as much as 20% based upon the weight of the steatite, the good physical properties of the steatite are substantially lost and the material becomes brittle and weak. With 15% of $MnO_2$ based on the weight of the steatite, the thermal expansion coefficient and the physical properties of the final product are at a practical optimum. If a hermetically sealed device is desired, it is necessary to employ a stabilizer in the steatite. In this connection, a relatively small quantity of $BaCO_3$ ranging up to about 10% by weight of steatite has been found desirable for this purpose. After firing, the $BaCO_3$ is converted to BaO, the $CO_2$ being lost during the firing operation.

The preferred compositional range of the compositions prepared in accordance with the present invention lies within the area enclosed by the lines ABCD of Figure 1. It will be appreciated that $Al_2O_3$ may be present in amounts less than about 5% based on the steatite without harm.

The process in accordance with the present invention is shown schematically in Figure 2; and reference is made thereto for more simple comprehension of the general aspects of the present invention.

A specific example of preparation is given below.

Example 1

The following dry ingredients were mixed in the following specified proportions.

| Ingredients: | Parts |
|---|---|
| Talc (under 200 mesh) | 90 |
| Silica | 10 |
| $BaCO_3$ | 10 |
| $MnO_2$ | 15 |
| Nepheline syenite | 2 |
| $Ca_3(PO^4)_2$ | 2 |
| Glass frit | 2 |

These ingredients are wet mixed until homogeneous and a binder is added. Polyvinyl pyrrolidone and hyform wax were added as binders prior to spray drying. Relative to the quantities employed, polyvinyl pyrrolidone was added in an amount equal to 1000 cc./100 pounds of dry powder, and hyform wax was added in a quantity equal to 3% of the dry weight of the oxides. The composition including the binders was then spray dried in a tower drier. The dried powder was then pressed and fired to the size and shape desired. In this connection, a pressing pressure of at least 3,000 p.s.i. was required and a pressure of 10,000 p.s.i. was found most desirable. The pressed material was then placed upon forsterite setters and fired at a temperature of 1325° C. for a period of two hours.

The shrinkage amounted to about 10% on parts pressed on 10,000 p.s.i. size and it will be appreciated that shrinkage varies inversely with the pressing pressure utilized. The lower shrinkage of steatite bodies permits closer tolerances in the final devices.

The finished product was vitrified ceramic having a thermal coefficient of expansion of between about $11.0 \times 10^{-6}$ and $11.5 \times 10^{-6}$ in./in./° C. this expansion coefficient being substantially linear from room temperature up to 600° C. If it is not essential that the device be impervious to gaseous fluids the barium carbonate and the other fluxes may be omitted from the composition. When no fluxes are employed, the thermal expansion coefficient will become slightly larger.

The above example is given for illustration only and it will be appreciated that other and further modifications may be prepared by those skilled in the art without departing from the spirit and scope of the present invention.

I claim:

1. A fired ceramic body consisting essentially of a mixture of particles including a flux matrix and bonded together in a mechanically stable body, said particles consisting essentially of steatite together with from about 12% to about 18% of $MnO_2$ based upon the weight of the steatite.

2. A fired ceramic body consisting essentially of a mixture of particles bonded together in a mechanically stable body, said particles consisting essentially of steatite together with from about 12% to about 18% of $MnO_2$ based upon the weight of the steatite.

3. A fired ceramic body consisting essentially of a mixture of particles including a flux matrix and held together in a mechanically stable body, said particles consisting essentially of steatite together with from about 12% to 18% of $MnO_2$ based upon the weight of the steatite, said steatite having a composition ranging from about 45% to about 55% of $SiO_2$, not more than about 5% of $Al_2O_3$, balance MgO.

4. A fired ceramic body consisting essentially of a mixture of particles including a vitreous flux matrix fused together in a mechanically stable body, said particles consisting essentially of steatite to which 15% of $MnO_2$, based upon the weight of the steatite, has been added.

5. A vitreous fired ceramic body substantially impervious to gaseous fluids consisting essentially of a mixture of particles including an interstitial flux matrix, said particles consisting essentially of steatite to which from about 12% to about 18% of $MnO_2$ based on the weight of the steatite has been added, and to which from about 4½% to about 7½% of BaO, based upon the weight of the steatite, has been added.

6. A non-porous fired ceramic body having a thermal coefficient of expansion ranging from about $10.5 \times 10^{-6}$ to about $12.0 \times 10^{-6}$ in./in./° C. consisting essentially of particles including an interstitial flux matrix fused together in a mechanically stable body, said particles consisting essentially of steatite and from about 12% to about 18% of $MnO_2$ based upon the weight of the steatite, said flux including BaO, $Ca_3(PO^4)_2$, and nepheline syenite.

7. A process for preparing ceramic bodies having a thermal coefficient of expansion ranging from about $10.5 \times 10^{-6}$ to about $12.0 \times 10^{-6}$ in./in./° C. which includes preparing a mixture of steatite to which from about 12% to about 18% of $MnO_2$ based on the weight of steatite has been added, a flux, and a binder, pressing said mixture under a pressure of at least 3,000 p.s.i., and firing said pressed body temperature of between 1280° C. and 1360° C. for a period of about 2 hours.

8. A process for preparing ceramic bodies having a thermal coefficient of expansion ranging from about $10.5 \times 10^{-6}$ to about $12.0 \times 10^{-6}$ in./in./° C. said process including preparing a mixture of steatite, to which from about 12% to 18% of $MnO_2$ based on the weight of steatite has been added, $BaCO_3$ in an amount ranging from about 6% to 10% by weight of the steatite, and binders, pressing said mixture under a pressure of about 10,000 p.s.i., and firing the pressed body at the temperature of between 1280° and 1360° C. for a period of about two hours.

9. A process for preparing ceramic bodies having a linear thermal coefficient of expansion ranging from about $10.5 \times 10^{-6}$ to about $12.0 \times 10^{-6}$ in./in./° C. said process including preparing a mixture of steatite to which from about 12% to 18% of $MnO_2$ based on the weight of steatite has been added, and a flux, pressing said mixture under a pressure of at least 3000 p.s.i. and firing the pressed body at a temperature in excess of about 1280° C. until vitrification is substantially complete.

References Cited in the file of this patent

UNITED STATES PATENTS

| | | |
|---|---|---|
| 2,062,914 | Kunstmann | Dec. 1, 1936 |
| 2,631,940 | Dunegan | Mar. 17, 1953 |
| 2,856,368 | MacIntyre et al. | Oct. 14, 1958 |